(12) United States Patent
Roa et al.

(10) Patent No.: US 9,843,969 B2
(45) Date of Patent: Dec. 12, 2017

(54) USER EQUIPMENT SPEED CLASS DETERMINATION

(71) Applicant: Futurewei Technologies, Inc., Plano, TX (US)

(72) Inventors: Juan Roa, Hillsborough, NJ (US); Baoling S. Sheen, Naperville, IL (US)

(73) Assignee: Futurewei Technologies, Inc., Plano, TX (US)

( * ) Notice: Subject to any disclaimer, the term of this patent is extended or adjusted under 35 U.S.C. 154(b) by 6 days.

(21) Appl. No.: 14/810,985

(22) Filed: Jul. 28, 2015

(65) Prior Publication Data

US 2017/0034742 A1    Feb. 2, 2017

(51) Int. Cl.

| H04W 36/00 | (2009.01) |
|---|---|
| H04W 36/32 | (2009.01) |
| H04W 24/08 | (2009.01) |
| H04W 36/30 | (2009.01) |
| H04W 24/10 | (2009.01) |
| H04W 88/02 | (2009.01) |

(52) U.S. Cl.
CPC ....... *H04W 36/0022* (2013.01); *H04W 24/08* (2013.01); *H04W 24/10* (2013.01); *H04W 36/0016* (2013.01); *H04W 36/0083* (2013.01); *H04W 36/0088* (2013.01); *H04W 36/30* (2013.01); *H04W 36/32* (2013.01); *H04W 88/02* (2013.01)

(58) Field of Classification Search
CPC ......... H04W 36/0083; H04W 36/0094; H04W 36/0088
See application file for complete search history.

(56) References Cited

U.S. PATENT DOCUMENTS

| 2011/0116464 | A1 | 5/2011 | Ishii et al. | |
|---|---|---|---|---|
| 2011/0188472 | A1 | 8/2011 | Jeon et al. | |
| 2013/0005381 | A1* | 1/2013 | Turkka | G01S 11/06 |
| | | | | 455/517 |
| 2014/0349658 | A1 | 11/2014 | Lin et al. | |
| 2015/0312815 | A1* | 10/2015 | Wanstedt | H04W 36/0077 |
| | | | | 455/436 |

FOREIGN PATENT DOCUMENTS

| CN | 102067701 | 5/2011 |
|---|---|---|
| CN | 103209450 | 7/2013 |
| CN | 103686895 | 3/2014 |

OTHER PUBLICATIONS

"International Application No. PCT/CN2016/091924, International Search Report dated Oct. 26, 2016", (Oct. 26, 2016), 4 pgs.

* cited by examiner

*Primary Examiner* — Nam Huynh
(74) *Attorney, Agent, or Firm* — Schwegman Lundberg & Woessner, P.A.

(57) ABSTRACT

A node device of a cellular communication network comprises physical layer circuitry and processing circuitry. The physical layer circuitry is operable to receive signal power information from a user equipment device (UE). The processing circuitry is operable to determine a speed of travel classification for the UE using the signal power information, and configure one or more operating parameters of the cellular communication network using the determined speed of travel classification for the UE.

18 Claims, 5 Drawing Sheets

USER EQUIPMENT SPEED CLASS DETERMINATION

BACKGROUND

Radio access networks can be used for delivering voice communications to user equipment such as a mobile cellular telephone or a smart phone. A cellular communication network includes fixed location transceivers distributed over land areas. Cell transceivers of the network may be included in cell towers to serve large land areas and cell transceivers may be arranged to serve smaller areas or to provide localized service such as within a building. The transceivers and the areas that they serve can be referred to as cells of the cellular network. User equipment (UE) refers to mobile equipment (e.g., a smart phone) that communicates using the network. For communication sessions for UEs that are stationary, a session can take place using one cell of the network. Communication sessions for UEs that are moving can place changing demands on the network.

SUMMARY

A node device includes physical layer circuitry and processing circuitry. The physical layer circuitry is operable to transmit and receive radio frequency (RF) electrical signals with at least one user equipment device (UE). The processing circuitry is operable to receive signal power information from the UE, determine a speed of travel classification for the UE using the signal power information, and configure one or more operating parameters of the cellular communication network using the determined speed of travel classification for the UE.

A method includes determining signal power information, wherein the signal power information indicates signal power received at a user equipment (UE) device; determining a speed of travel classification for the UE device using the signal power information; and configuring one or more operating parameters of the cellular communication network using the speed of travel classification.

This summary is intended to provide an overview of subject matter of the present patent application. It is not intended to provide an exclusive or exhaustive explanation of the invention. The detailed description is included to provide further information about the present patent application.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
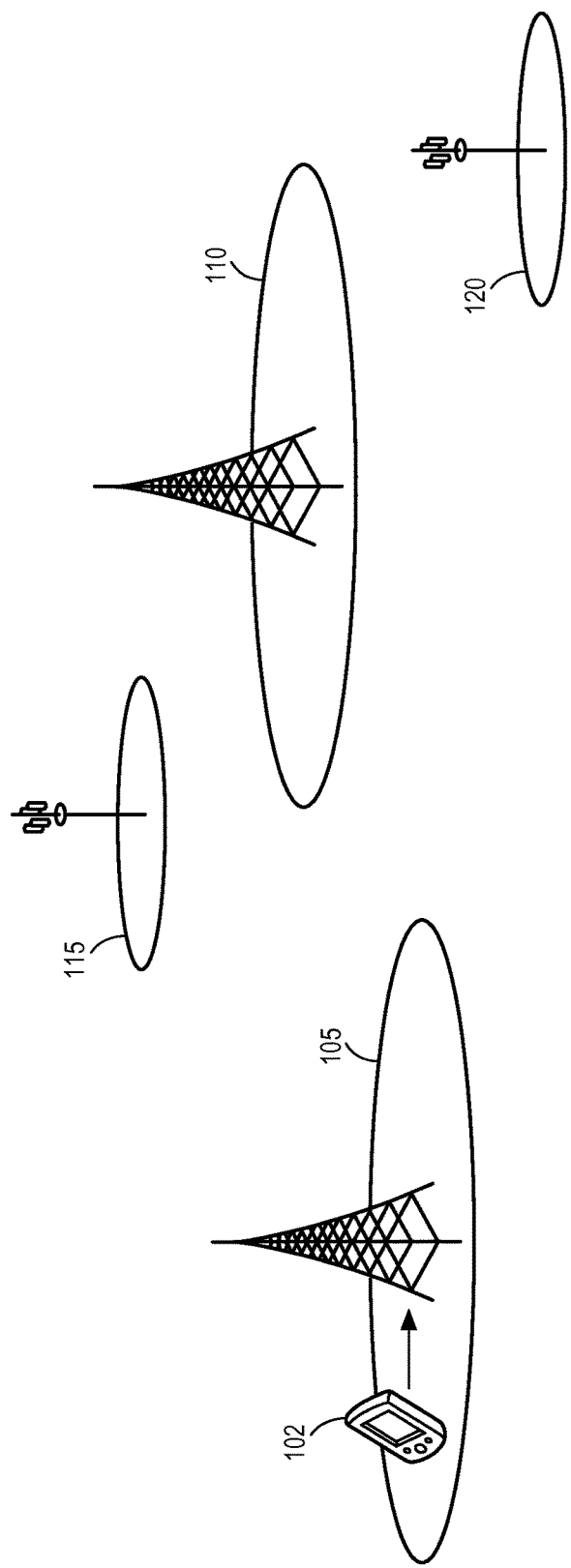
FIG. 1 is a diagram illustrating an example of portions of a cellular communication network.

FIG. 1 illustrates an example of portions of a cellular communication network. In certain embodiments, the network is a Universal Mobile Telecommunications System (UMTS) network. The network 100 can include one or both of macro cells 105, 110 that service larger areas and smaller cells 115, 120 that service smaller areas. If the network 100 includes only macro cells 105, 110, or if the network 100 includes only smaller cells 115, 120, the network 100 is a homogeneous network. If the network 100 includes both a macro cell and a smaller cell, the network 100 is a heterogeneous network. FIG. 1 also illustrates user equipment (UE) 102 operating in the network. the UE 102 may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

UE mobility can change demands on the network cells. Overcrowding of a cell or cells by UEs can lead to quality of service (QoS) issues for network users. Tasks of the network operator can benefit from knowledge of UE mobility. For example, allocation of cells in the network can be changed if demand by UEs can be anticipated using knowledge of UE mobility. Additionally, UE mobility trending can be used by the operator for resource management or by urban planners to prepare for urban expansion. UE mobility information can also be useful for crisis response. Additionally, knowing the degree of mobility of the UE (e.g., low, medium, or high mobility) may be useful to classify UEs according to speed of travel. A speed of travel classification may be used to determine the services to provide to the UE. Different services may be available if it is known that the UE is moving relatively slowly (e.g., when the user is walking) versus the UE is moving at high speed (e.g., when the user is riding in a car).

The speed with which a UE is travelling can be computed by the UE if the UE has GPS capability. However, generating GPS data can be expensive from a battery energy viewpoint. Users may want to switch off GPS to reduce the energy drain from the UE's battery supply. Additionally, a user may turn off GPS as a privacy preference. Also, GPS data may not be available if the UE is indoors. Thus, using GPS to determine UE speed may not always be a desirable approach to determining UE mobility information.

It would be desirable to determine UE mobility using network side information rather than using the UE information. This allows UE mobility to be determined without adding hardware or software requirements to the UE. One approach to determine UE mobility information is to track the number of times the UE experiences a handover from one cell to another cell during a communication session. This may be done using a node device. However, while this approach can provide an indication that a UE is a mobile, it may not provide information of the degree of mobility of the UE if the network is a heterogeneous network in which cells can have different sizes.

Figure 2:
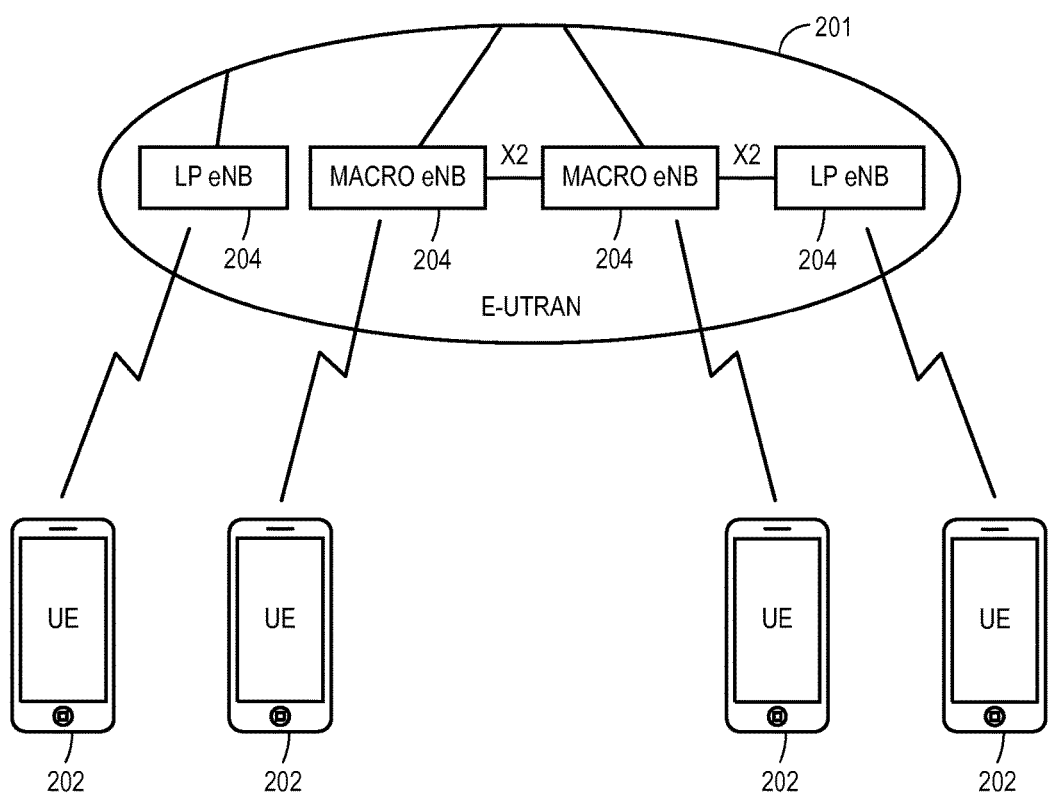
FIG. 2 is a block diagram illustrating portions of an example of an evolved universal terrestrial radio access network.

FIG. 2 illustrates portions of an example of an evolved universal terrestrial radio access network (or E-UTRAN)

included in the network of FIG. 1. The E-UTRAN 201 includes node devices for communicating with UE (202). The node devices terminate the air interface protocol and may be the first point of contact to the network for a UE 202. UEs 202 may be configured to communicate orthogonal frequency-division multiplexing (OFDM) communication signals with a node device over a multicarrier communication channel in accordance with an orthogonal frequency-division multiple access (OFDMA) communication technique. The node devices may fulfill various logical functions for the network including but not limited to RNC (radio network controller) functions such as radio bearer management, uplink and downlink dynamic radio resource management and data packet scheduling, and mobility management.

In the example shown in FIG. 2, the node devices are enhanced node Bs (eNBs) 204, which may operate as base stations. The eNBs 204 may include macro eNBs for macro cells and low power (LP) eNBs. LP eNBs may be included with small cells to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a microcell. A femtocell is typically provided by a mobile network operator to its residential or enterprise customers. A femtocell is typically the size of a residential gateway or smaller and generally connects to the user's broadband line. Once plugged in, a femtocell eNB connects to the mobile operator's mobile network and provides extra coverage in a range of typically 30 to 50 meters for residential femtocells.

Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB because it is coupled to a macro eNB via an X2 interface. Picocell eNBs or other LP eNBs may incorporate some or all functionality of a macro eNB. In some cases, this may be referred to as an access point base station or enterprise femtocell.

Because cell handovers may include cells of very different cell sizes, merely counting the number of handovers may not give an accurate estimate of the class of UE mobility if the UE is communicating using a heterogeneous network. A better approach is to use the available signal power information measured at the UE that can be made available to the node device.

For example, in cellular communication networks, a UE may measure received signal power multiple times during a communication session (e.g., a voice call, a media download, etc.). The UE reports the measured signal power for the serving and additional cells (e.g., up to six other nearby cells) in a measurement report (MR) sent to the node device. The MR can include a received signal code power (RSCP) that denotes the power measured by a receiver on a particular physical communication channel. Changes in RSCP measurements may reflect mobility of the UE. The assignment of the serving cell and the ordering of the other nearby cells in a sequence of MRs received at a node device is (a) stable if the UE is stationary or moving at very slow speed, (b) changing if the UE is moving, and (c) increasingly volatile if the UE starts moving at high speed.

Figure 3:
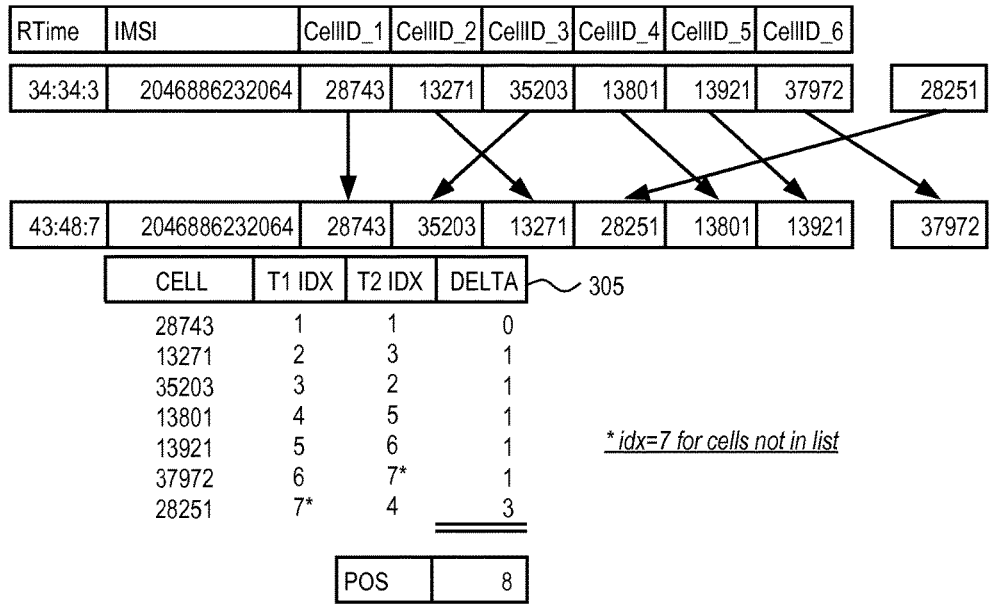
FIG. 3 is diagram representing two consecutive measurement report examples received at a node device from user equipment.

FIG. 3 shows a representation of two consecutive MRs received at a node device from a UE. The MRs include a UE identifier (e.g., an international mobile subscriber identity (IMSI), international mobile equipment identity (IMEI), or a radio network temporary identifier or (RNTI)) and a number of cell identifiers (IDs). The cell identifiers may be arranged according to received signal strength or measured signal power. Knowledge of whether the positions of the cell IDs are stable, changing, or increasingly volatile can be used to determine a speed of travel classification for the UE.

Figure 4:
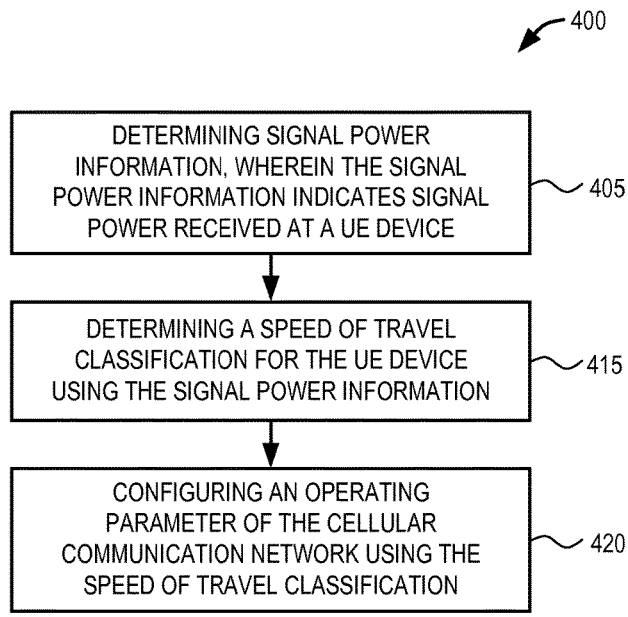
FIG. 4 is a flow diagram of an example of a method of operating a network node device.

FIG. 4 is a flow diagram of an embodiment of a method 400 of operating a node device. At 405, signal power information is determined. The signal power information indicates signal power received at a UE device. At 415, a speed of travel classification is determined for the UE device using the signal power information. At 420, once the speed of classification is known, the classification of the UE or the classifications of multiple UEs can be used to configure an operating parameter of the cellular communication network. One approach to determine the speed of travel classification is to calculate a score to account for changes in the top cells reported in consecutive MRs.

Returning to FIG. 3, two consecutive MRs are shown. MR1 is transmitted by the UE first and shows a first time stamp (RTime). MR2 is the next MR transmitted by the UE and includes a second time stamp. Each MR includes a UE ID, a cell ID (CellID) of the serving cell, and up to five cell IDs of the nearby cells having the strongest signal power as measured by the UE. After the serving cell, the cell IDs are ordered according to the measured signal power.

FIG. 3 also shows a table 305 to illustrate an approach for calculating a positional score (POS) for the UE transmitting the signal power information. The table shows that each cell ID is assigned an index according to its position in an MR received during the same communication session. Indexes are assigned to each cell ID for MR1 received at time T1 (T1 IDX) and for MR2 received at time T2 (T2 IDX). The indexes include values of 1 through 6 to represent a cell IDs position in the MR. If the cell ID was not present in one of the MRs, but is present in the other, the cell ID is assigned a value of 7 for that MR. The change in position between consecutive MRs is then calculated and is shown as DELTA in the table. In certain variations, MRs are consecutive if the MRs are received with no time gaps above a threshold time gap value (e.g., 60 seconds). The change values or DELTAs are summed to arrive at the positional score.

In equation form, the above DELTA and positional score (POS) for the UE using MR(k) and MR(k+1) can be expressed as $$DELTA_i = |IDX_{i,k} - IDX_{i,k+1}|; \text{ and}$$

$$POS_{k+1} = \sum_{\substack{i: all cells \\ in k, k+1}} |IDX_{i,k} - IDX_{i,k+1}|.$$

In the equations, $IDX_{i,k}$ is the value of an index representing the position of cell i in the kth MR.

Based on the positional score, the UE is given a speed of travel classification. For example, the UE may be assigned a speed class of "stationary" if the positional score is less than 1, a speed class of "moving, possibly slow" if the positional score is calculated to be between 1 and 25, and speed class of "moving, possibly fast" if the positional score is calculated to be 25 or higher. For the example shown in table 305, the index for CellID 35203 at time 34:34:3 is 3 and the index for CellID 35203 at time 43:48:7 is 2. The DELTA for CellID 35203 is 1. The POS for the UE is 8.

Thus, a speed of travel classification for the UE can be determined by using variabilities of the signal power information for different cells included in MR reports.

Figure 5:
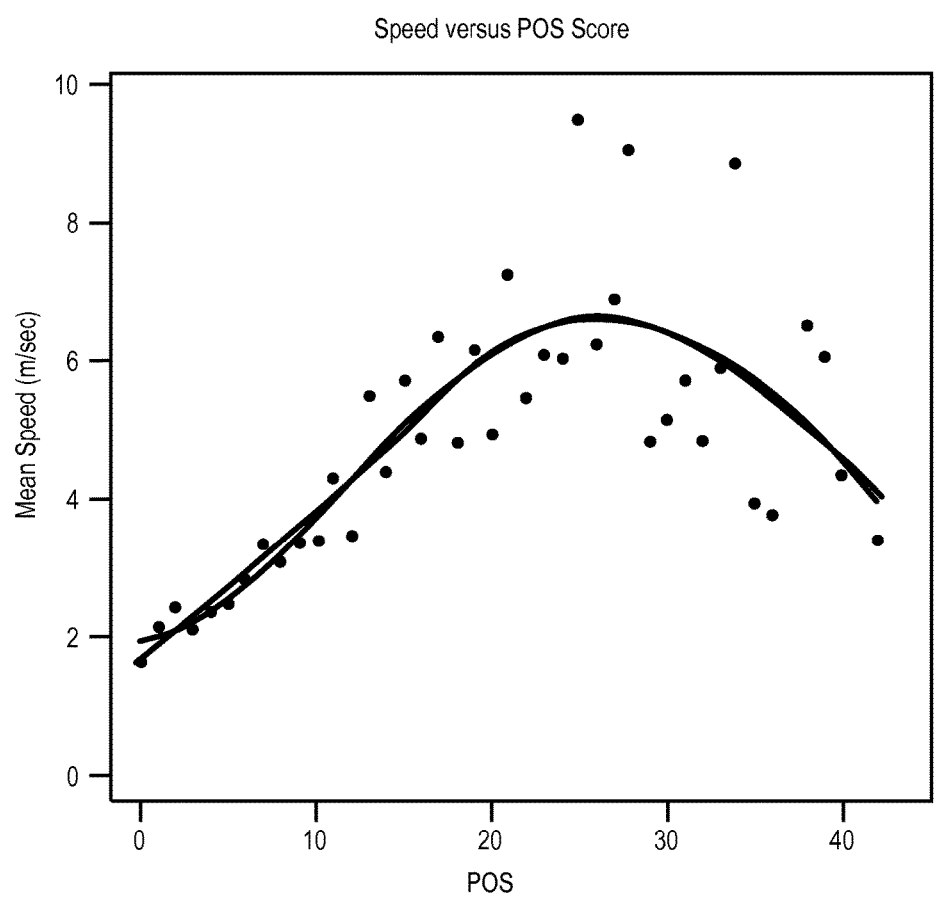
FIG. 5 is an example graph of mobility data for user equipment.

FIG. 5 shows a graph 500 of mobility data for UEs. The graph 500 shows positional score versus mean speed of UEs determined for a communication session. The positional score of a UE was calculated using the method above and mean speed of a UE was calculated using GPS data. The graph 500 shows that the positional score shows good correlation with actual speed up to a score of 25. Above a score of 25, the mean speed no longer positively correlates with the positional score. This may be because the data was taken for an urban area where cell phone use was high especially by pedestrians, but there was little data for UEs moving very fast (e.g., for UEs being used in a vehicle). Nonetheless, the positional score can provide a reasonable estimate of the mobility of a UE.

Figure 6:
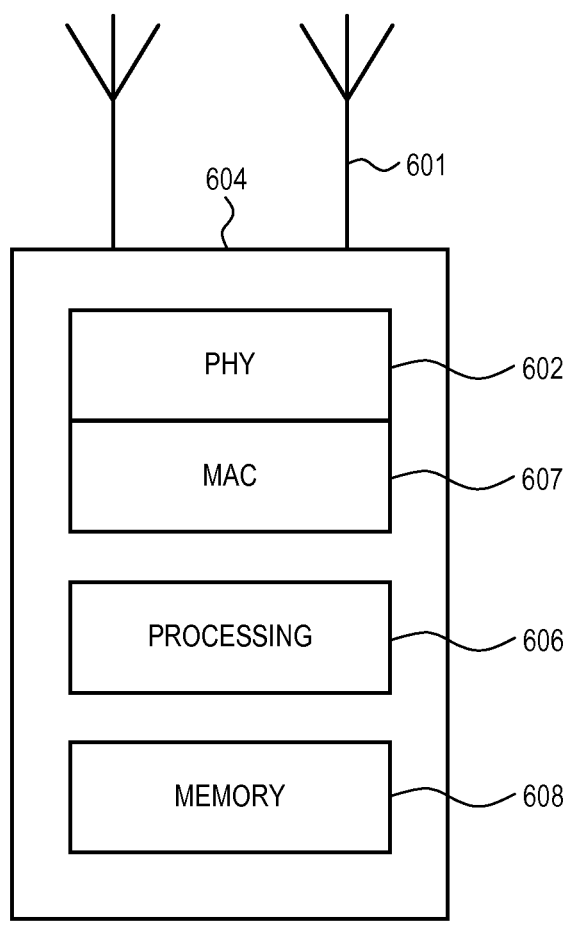
FIG. 6 is a block diagram of portions of an example of a node device of a cellular communication network.

FIG. 6 shows a block diagram of portions of an embodiment of a node device of a cellular communication network. The node device 604 may be part of a broadband wireless access (BWA) network communication network, such as a Worldwide Interoperability for Microwave Access (Wi-MAX) communication network or a 3rd Generation Partnership Project (3GPP) Universal Terrestrial Radio Access Network (UTRAN) or an LTE communication network or a high speed downlink/uplink access (HSDPA/HSUPA) communication network.

The node device 604 includes physical layer (or PHY) circuitry and processing circuitry. The PHY circuitry 602 transmits and receives radio frequency (RF) electrical signals with at least one user equipment device (UE) using one or more antennas 601 electrically coupled to the PHY circuitry 602. The PHY circuitry 602 may include circuitry for modulation/demodulation, upconversion/downconversion, filtering, amplification, etc. The node device 604 may also include medium access control layer (MAC) circuitry 607 for controlling access to the wireless medium and to configure frames or packets for communicating over the wireless medium.

The node device 604 also includes processing circuitry 606 and memory 608 arranged to configure the various elements of the node device 604 to perform the operations described herein. The memory 608 may be used to store information for configuring the processing circuitry 606 to perform the operations. The processing circuitry 606 receives signal power information from the UE, determines a speed of travel classification for the UE using the signal power information, and configures one or more operating parameters of the cellular communication network using the determined speed of travel classification for the UE.

In some embodiments, the signal power information includes an MR communicated to the node device by the UE. As explained previously herein, the MR identifies one or more cells used by the UE during a communication session. In the MR, the cells can be sorted according to cell signal strength. In certain embodiments, the cells are ranked according to cell signal strength. Multiple MRs may be received by the node device from a UE during a communication session (e.g., a voice call). The processing circuitry 606 associates the speed of travel classification using a change in the ranking of the one or more cells between the received MRs.

In some embodiments, the processing circuitry 606 calculates a positional score for the UE using consecutive MRs communicated by the UE during the communication session, and associates the speed of travel classification with the UE according to the calculated positional score. An approach to calculating a positional score was described previously herein in regard to FIG. 3. In an example intended to be illustrative and non-limiting, the processing circuitry 606 associates a speed classification of one of stationary, moving slowly, and moving fast according to the positional score.

Using the speed classification determined for one or more UEs, the processing circuitry 606 configures one or more operating parameters of the cellular communication network. In some embodiments, the processing circuitry 606 may set a handover parameter using the determined speed of travel classification. For example, a handover may occur when the signals from the serving cell become weak and the signals from another cell become stronger. A "time-to-trigger" parameter can be used to prevent the UE from ping-ponging between the two cells when the signals between cells are comparable, such as when the UE is near the middle of the two cells. The node device may notify the UE to shorten the time-to-trigger parameter if the speed of travel classification of the UE is determined to be moving fast.

In another example, the processing circuitry 606 may use the speed classification for cell selection. Cell selected for idle UEs can determine which cells will be the serving cell when the UE becomes active (e.g., starts or joins a communication session). In areas being covered by both macro cells and small cells, the node device can inform the UE to reselect to (e.g., camp on) a macro cell instead of a small cell to avoid potentially frequent handover of the UE.

Although the node device 604 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, machine learning algorithms may be performed by the node device to analyze fluctuations in the position of cells in the MRs for a single communication session. For example, the node device may use the fluctuation information to build a predictive model to generate a speed classification for a UE given a received MR sequence.

According to some examples, the speed classification of the UE is determined by the UE. The UE also includes PHY layer circuitry and processing circuitry. The processing circuitry ranks one or more cells used by the UE during a communication session according to cell signal strength, and determines the speed of travel classification using any of the methods described previously herein, such as by determining a change in the ranking of the cells.

The UE configures an operation of the UE using the determined speed classification. In some embodiments, the processing circuitry provides the speed of travel classification to an application executable on the UE. For example, an application executing on the UE may use the speed of travel classification to block certain calls or activities, such as disabling texting if the speed of travel is determined to be moving fast (e.g., such as when driving).

The several examples described herein provide for determining the mobility of a UE without the need for additional information not already available and without the need for additional hardware or software requirements for the UE. Knowledge of UE mobility can allow operators to optimize use of the communication network. The several examples described herein allow a reasonable estimation of the speed of travel classification, and are conceptually simple and can be implemented very efficiently.

ADDITIONAL NOTES AND EXAMPLES

Example 1 includes subject (such as a node device of a cellular communication network) comprising physical layer circuitry operable to receive signal power information from a user equipment device (UE); and processing circuitry operable to determine a speed of travel classification for the UE using the signal power information; and configure one or more operating parameters of a cellular communication network using the determined speed of travel classification for the UE.

In Example 2, the subject matter of Example 1 optionally includes signal power information that includes a measurement report (MR) communicated by the UE, wherein the MR identifies one or more cells used by the UE during a communication session and sorts the one or more cells according to cell signal. Strength.

In Example 3, the subject matter of Example 2 optionally includes processing circuitry operable to associate a speed of travel classification with the UE using multiple MRs communicated by the UE during the communication session, and to configure the one or more operating parameters of the cellular network using the speed of travel classification.

In Example 4, the subject matter of one or both of Examples 2 and 3 optionally includes processing circuitry operable to calculate a positional score for the UE using consecutive MRs communicated by the UE during the communication session, and associate the speed of travel classification with the UE according to the calculated positional score.

In Example 5, the subject matter of one or any combination of Examples 2-4 optionally includes an MR that includes a ranking of the one or more cells used by the UE during the communication session according to cell signal strength, and wherein the processing circuitry is operable to associate the speed of travel classification using a change in the ranking of the one or more cells.

In Example 6, the subject matter of Example 5 optionally includes processing circuitry operable to calculate a positional score for the UE as $$POS_{k+1} = \sum_{\substack{i:allcells \\ in\,k,k+1}} |IDX_{i,k} - IDX_{i,k+1}|$$

wherein $IDX_{i,k}$ is a value of an index representing the position of cell i in the kth MR, and associate the speed of travel classification with the UE according to the calculated positional score.

In Example 7, the subject matter of one or any combination of Examples 1-6 optionally includes processing circuitry operable to allocate a cell operational parameter to the UE according to the speed of travel classification.

In Example 8, the subject matter of one or any combination of Examples 1-7 optionally includes processing circuitry operable to set one or more handover parameters for the UE according to the speed of travel classification.

In Example 9, the subject matter of one or any combination of Examples 1-8 optionally includes processing circuitry operable to determine the speed of travel classification for the UE by using variabilities of the signal power information for different cells included in MR reports.

Example 10 includes subject matter (such as a user equipment device), or can optionally be combined with the subject matter of one or any combination of Examples 1-9 to include such subject matter, comprising physical layer circuitry operable to transmit and receive radio frequency (RF) electrical signals with a network node device; and processing circuitry operable to: determine received signal power information; determine a speed of travel classification of the UE using the determined signal power information; and configure an operation of the UE using the determined speed of travel classification.

In Example 11, the subject matter of Example 10 optionally includes processing circuitry operable to: rank one or more cells used by the UE during a communication session according to cell signal strength; and determine the speed of travel classification using a change in the ranking of the one or more cells.

In Example 12, the subject matter of Example 11 optionally includes processing circuitry operable to calculate a positional score using the received signal power information and determine the speed of travel classification using the calculated positional score.

In Example 13, the subject matter of one or any combination of Examples 10-12 optionally includes processing circuitry operable to provide the speed of travel classification to an application executable on the UE.

Example 14 includes subject matter (such as a method, a means for performing acts, or a machine-readable medium including instructions that, when performed by the machine, cause the machine to perform acts), or can optionally be combined with the subject matter of one or any combination of Examples 1-13 to include such subject matter, comprising determining signal power information, wherein the signal power information indicates signal power received at a user equipment (UE) device; determining a speed of travel classification for the UE device using the signal power information; and configuring one or more operating parameters of the cellular communication network using the speed of travel classification.

In Example 15, the subject matter of Example 14 optionally includes receiving a measurement report (MR) communicated to the node device by the UE, wherein the MR identifies one or more cells used by the UE during a communication session and ranks the one or more cells according to cell signal strength, and determining the speed of travel classification using a change in the ranking of the one or more cells.

In Example 16, the subject matter of one or both of Examples 14 and 15 optionally includes receiving multiple measurement reports (MRs) communicated to the node device by the UE, wherein an MR identifies one or more cells used by the UE during a communication session and ranks the one or more cells according to cell signal strength.

In Example 17, the subject matter of one or both of Examples 15 and 16 optionally includes calculating a positional score for the UE using consecutive MRs communicated by the UE during the communication session, and associating the speed of travel classification with the UE according to the calculated positional score.

In Example 18, the subject matter of Example 17 optionally includes calculating the positional score as $$POS_{k+1} = \sum_{\substack{i:allcells \\ in\,k,k+1}} |IDX_{i,k} - IDX_{i,k+1}|$$

wherein $IDX_{i,k}$ is a value of an index representing the position of cell i in the kth MR.

In Example 19, the subject matter of one or any combination of Examples 14-18 optionally includes changing one or more handover parameters for the UE according to the speed of travel classification.

In Example 20, the subject matter of any or any combination of Examples 14-19 optionally includes allocating a cell for the UE according to the speed of travel classification.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A node device of a cellular communication network, the node device comprising:
   physical layer circuitry to receive signal power ranking information of multiple cells from a user equipment device (UE), wherein the signal power ranking information includes a measurement report (MR) communicated by the UE that includes a ranking of the multiple cells according to cell signal power received at the UE; and
   processing circuitry to:
   calculate a positional score for the UE as $$POS_{k+1} = \sum_{\substack{i:allcells \\ in\,k,k+1}} |IDX_{i,k} - IDX_{i,k+1}|$$

wherein $IDX_{i,k}$ is a value of an index representing the position of cell i in the kth MR;
   associate the speed of travel classification with the UE according to the calculated positional score; and
   configure one or more operating parameters of a cellular communication network using the determined speed of travel classification for the UE.

2. The node device of claim 1, wherein the MR identifies one or more cells used by the UE during a communication session and sorts the one or more cells according to cell signal strength.

3. The node device of claim 2, wherein the processing circuitry is to associate a speed of travel classification with the UE using multiple MRs communicated by the UE during the communication session, and to configure the one or more operating parameters of the cellular network using the speed of travel classification.

4. The node device of claim 3, wherein the processing circuitry is to calculate a positional score for the UE using consecutive MRs communicated by the UE during the communication session, and associating the speed of travel classification with the UE according to the calculated positional score.

5. The node device of claim 3, wherein an MR includes a ranking of cells used by the UE during the communication session according to cell signal strength, and wherein the processing circuitry is to associate the speed of travel classification using a change in the ranking of the one or more cells.

6. The node device of claim 1, wherein the processing circuitry is to allocate a cell operational parameter to the UE according to the speed of travel classification.

7. The node device of claim 1, wherein the processing circuitry is to set one or more handover parameters for the UE according to the speed of travel classification.

8. The node device of claim 1, wherein the processing circuitry is to determine the speed of travel classification for the UE using variabilities of the signal power ranking information for different cells included in MR reports.

9. A method of operating a node device of a cellular communication network, the method comprising:
  determining signal power ranking information of multiple cells, wherein the signal power ranking information includes a measurement report (MR) communicated by the UE that includes a ranking of multiple cells according to cell signal power received at a user equipment (UE) device from the multiple cells;
  calculating the positional score includes calculating the positional score as $$POS_{k+1} = \sum_{\substack{i:allcells \\ in\, k, k+1}} |IDX_{i,k} - IDX_{i,k+1}|$$

wherein $IDX_{i,k}$ is a value of an index representing the position of cell i in the kth MR;
  determining a speed of travel classification for the UE according to the calculated positional score; and
  configuring one or more operating parameters of the cellular communication network using the speed of travel classification.

10. The method of claim 9,
  wherein the MR identifies one or more cells used by the UE during a communication session and ranks the one or more cells according to cell signal strength, and
  wherein determining the speed of travel classification includes determining the speed of travel classification using a change in the ranking of the one or more cells.

11. The method of claim 9, wherein determining the signal power ranking information includes receiving multiple measurement reports (MRs) communicated to the node device by the UE, wherein an MR identifies one or more cells used by the UE during a communication session and ranks the one or more cells according to cell signal strength.

12. The method of claim 11, wherein determining the speed of travel classification includes calculating a positional score for the UE using consecutive MRs communicated by the UE during the communication session, and associating the speed of travel classification with the UE according to the calculated positional score.

13. The method of claim 9, wherein configuring an operating parameter includes changing one or more handover parameters for the UE according to the speed of travel classification.

14. The method of claim 9, wherein configuring an operating parameter includes allocating a cell for the UE according to the speed of travel classification.

15. A non-transitory computer-readable storage medium storing instructions for mobile radio frequency (RF) communication that when executed by one or more processors cause the one or more processors to:
  receive signal power ranking information of multiple cells from a user equipment device (UE), wherein the signal power ranking information includes a measurement report (MR) communicated by the UE that includes a ranking of the multiple cells according to cell signal power received at the UE;
  calculate a positional score for the UE as $$POS_{k+1} = \sum_{\substack{i:allcells \\ in\, k, k+1}} |IDX_{i,k} - IDX_{i,k+1}|$$

wherein $IDX_{i,k}$ is a value of an index representing the position of cell i in the kth MR;
  determine a speed of travel classification for the UE according to the calculated positional score; and
  configure one or more operating parameters of a cellular communication network using the determined speed of travel classification for the UE.

16. The non-transitory computer readable storage medium of claim 15, including instructions that cause the one or more processors to:
  receive the MR that identifies one or more cells used by the UE during a communication session and ranks the one or more cells according to cell signal strength, and
  determine the speed of travel classification using a change in the ranking of the one or more cells.

17. The non-transitory computer readable storage medium of claim 15, including instructions that cause the one or more processors to receive multiple measurement reports (MRs) communicated by the UE, wherein an MR identifies one or more cells used by the UE during a communication session and ranks the one or more cells according to cell signal strength.

18. The non-transitory computer readable storage medium of claim 17, including instructions that cause the one or more processors to calculate a positional score for the UE using consecutive MRs communicated by the UE during the communication session, and associate the speed of travel classification with the UE according to the calculated positional score.

* * * * *